United States Patent

Wagman

[11] Patent Number: 5,848,212
[45] Date of Patent: Dec. 8, 1998

[54] HIGH DENSITY OPTICAL CABLE

[75] Inventor: Richard S. Wagman, Hickory, N.C.

[73] Assignee: Siecor Corporation, Hickory, N.C.

[21] Appl. No.: 711,580

[22] Filed: Sep. 10, 1996

[51] Int. Cl.$^6$ .................................................. G02B 6/44
[52] U.S. Cl. ........................... 385/111; 385/112; 385/113; 385/110; 385/114
[58] Field of Search .................................. 385/104–106, 385/110–114

[56] References Cited

U.S. PATENT DOCUMENTS 5,420,955  5/1995  Cooke et al. ............................ 385/110
5,542,019  7/1996  Pascher .................................. 385/105

FOREIGN PATENT DOCUMENTS 39623  9/1993  Japan .

Primary Examiner—Hemang Sanghavi

[57] ABSTRACT

An optical fiber cable having a minimum bend radius and comprising at least one U-shaped carrier helically stranded about a coaxial rod having a central axis and including in its lateral peripheral surface at least one groove, said groove containing at least one optical fiber element, is characterized in that the maximum compressive force on said U-shaped carrier caused by bending the cable to its minimum bend radius is less than the minimum such force which could cause said U-shaped carrier to buckle toward said groove. A cable with 16-fiber ribbons containing 250 $\mu$m outer diameter (OD) fibers may contain up to 3200 optical fibers. The cable cross-section packing density may be 2.13 fibers/mm$^2$.

21 Claims, 5 Drawing Sheets

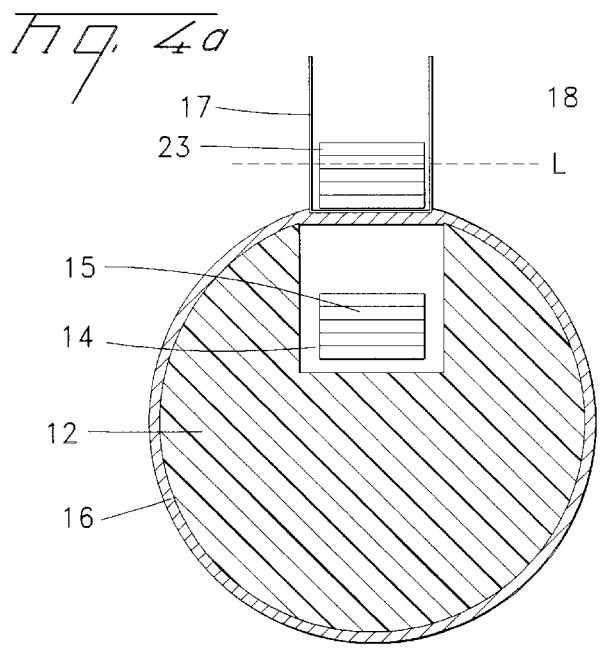
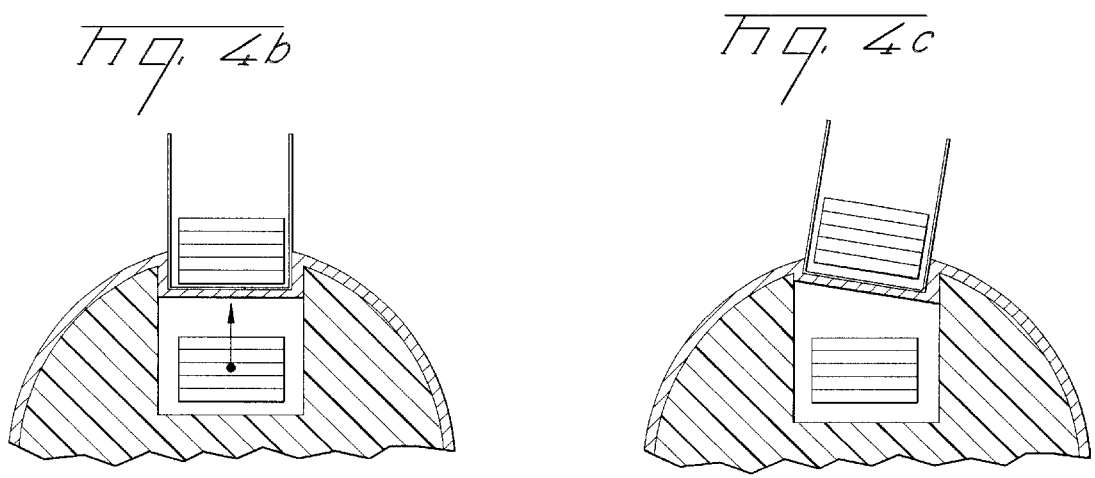

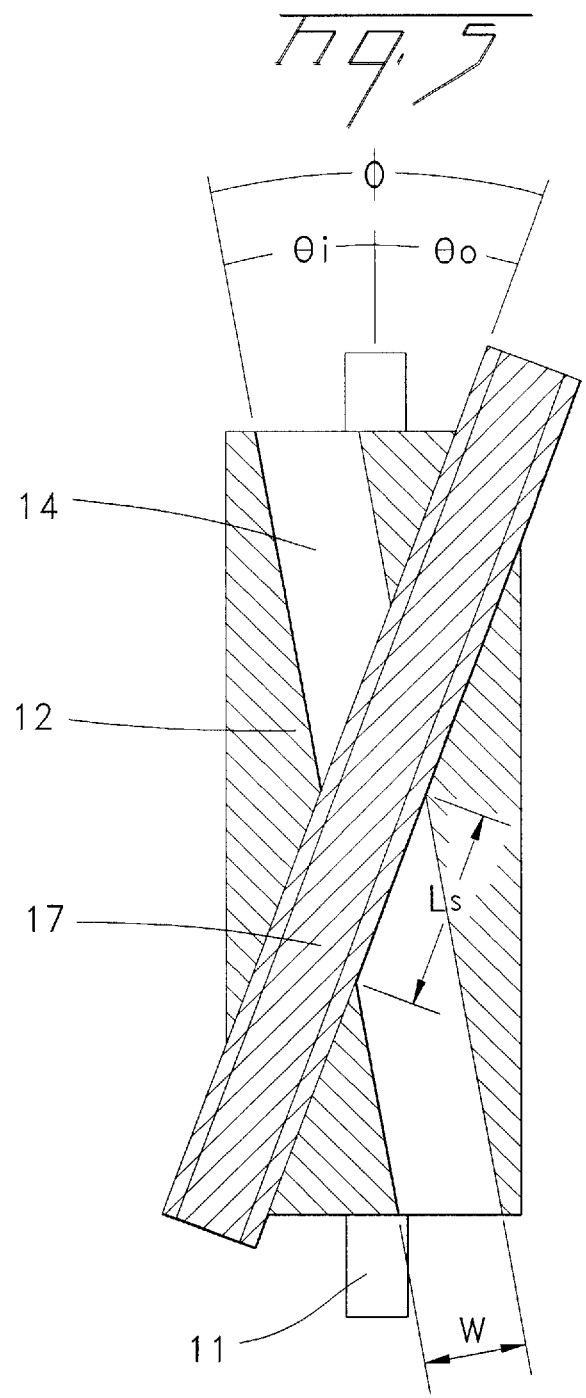

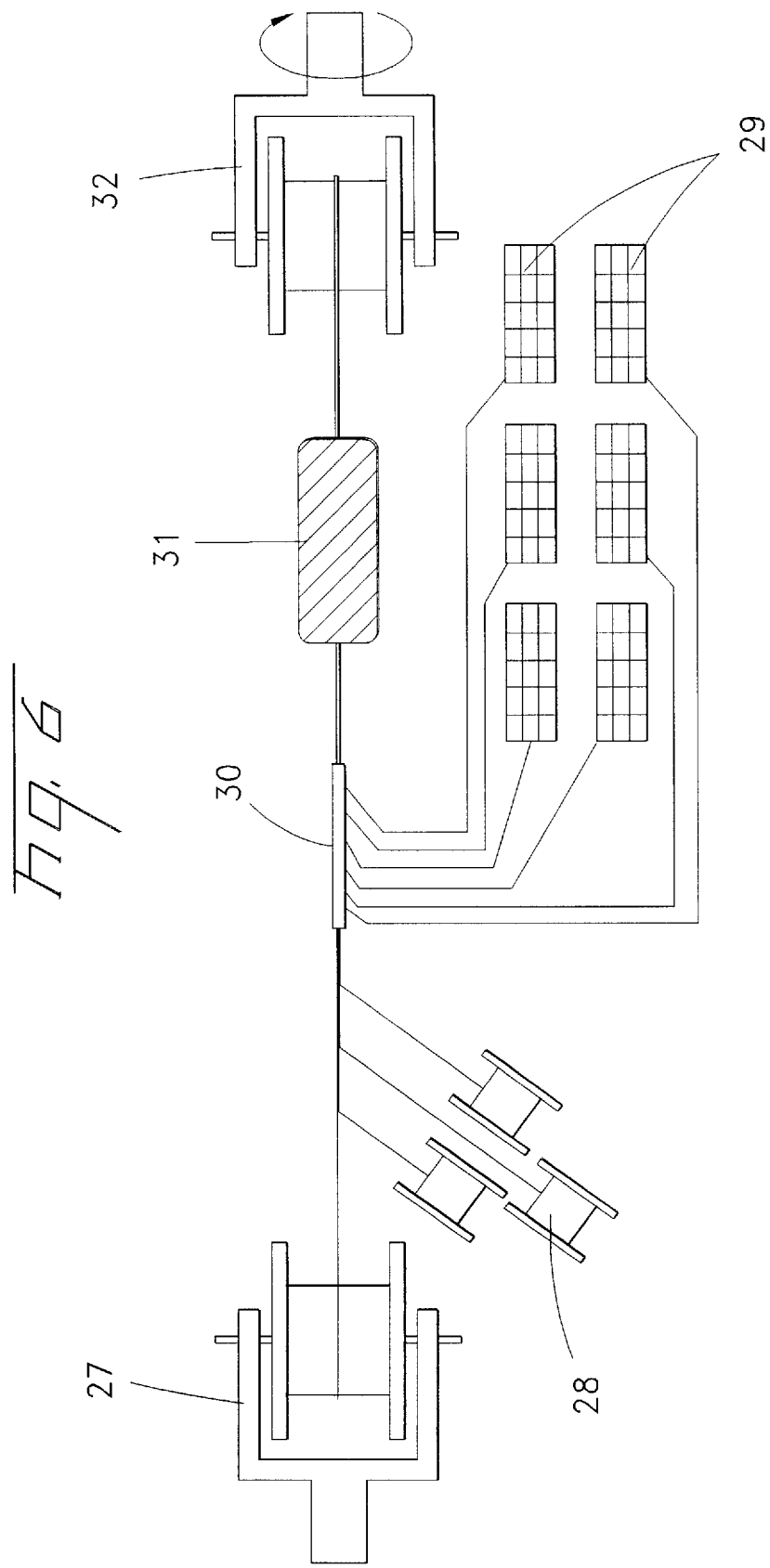

HIGH DENSITY OPTICAL CABLE

BACKGROUND OF THE INVENTION

This invention relates to high density optical fiber cables including a layer of U-shaped carriers about a slotted core member.

A conventional high density cable of hybrid design is disclosed in published Japanese patent application JP 4-39623. This conventional cable includes a slotted rod surrounded by a layer of generally U-shaped carriers. Grooves are formed in spirals on the surface of the rod, and the grooves formed by the U-shaped carriers also proceed in spirals. A stack of optical fiber ribbons is housed in each of the grooves in the rod and in the U-shaped carrier layer.

When such a hybrid cable is bent, the portions of the U-shaped carriers on the outside of the curve are placed under axial tension, and portions of the U-shaped carriers on the inside of the curve are placed under axial compression. A structure which is exposed to excessive axial compression is subject to buckling. When a structure buckles, it bends, deflecting laterally. The exact shape of the deflection depends upon the structure's mechanical properties, shape, and whether the structure's ends are free, pinned, or fixed. The buckled structure may assume various mode shapes, including S-shapes and other curves. The U-shaped carriers are subject to such buckling, which may tend to cause movement of the U-shaped carriers in planes which are radial with respect to the cable central axis.

Because the pitches of the U-shaped carriers and the rod grooves are short relative to the length of the cable, over the length of the cable a U-shaped carrier may repeatedly cross over a rod groove. Over the length of the cable, the curves followed by the rod grooves and the U-shaped carriers repeatedly will pass each other, with the result at such points being that a U-shaped carrier will overlie a rod groove for some distance. Each location at which a U-shaped carrier passes over a rod groove is called a "crossover" hereinafter. A U-shaped carrier may intrude into a rod groove at such crossovers due to buckling.

The U-shaped carriers normally are constrained by the ribs of the slotted rod and the cable jacket. Thus, forces on a U-shaped carrier may be axially transmitted along the U-shaped carrier to any location where a potential free space is offered. Crossover locations offer such potential free spaces, and under axial compressive forces on the inside of a cable bend, U-shaped carriers could buckle into the rod grooves because they offer a location to release compressive strains present in the U-shaped carriers, Optical fiber cables typically are provided with a tape containing water-swellable material over the grooved rod. The main function of such a tape is to block the flow of water in the event that the sheath of the cable is breached. Its secondary function is to retain optical fibers or optical fiber ribbons within the rod grooves. Of course, the tape can serve ancillary functions, such as physically separating the optical elements in the rod grooves from overlying cable elements. The tape typically comprises a backing, such as polyester, so that the tape can be wound easily about the rod. Such a tape does not have the strength to be suitable for resisting intrusion of the U-shaped carriers into the rod grooves.

Therefore, if the helix angles of the U-shaped carriers and the rod grooves are improperly selected, the U-shaped carriers may buckle and intrude into the rod grooves, especially at crossovers on the inside of the curve of a bent cable. Such intrusion may cause a U-shaped carrier to contact a stack of optical fiber ribbons housed in the rod groove. Such contact may cause increased attenuation of optical fibers in the groove. This attenuation may be caused at the time of bending due to physical forces exerted by the U-shaped carrier contacting the ribbons, or at a later time if the contact disorders optical fiber ribbons in the stack.

When a cable is bent, optical elements housed in the rod grooves tend to move radially outward within the grooves. Thus, the potential for harm is increased if the optical elements move radially outward within a groove at the same time that a U-shaped carrier intrudes into the groove due to buckling. (See FIG. 4b.)

SUMMARY OF THE INVENTION

It is therefore an object of the present invention to provide high density optical fiber cables including a layer of U-shaped carriers about a slotted rod, such cables having a decreased risk of additional attenuation caused by buckling of the U-shaped carriers.

These and other objects are provided, according to the present invention, by an optical fiber cable comprising at least one U-shaped carrier helically stranded at a first helix angle $\theta_0$ and a first handedness about a rod having a central axis and including in its lateral peripheral surface at least one groove proceeding helically at a second heilx angle $\theta_i$ and a second handedness, said groove containing at least one optical fiber element. The helix angles $\theta_0$ and $\theta_i$ are so defined as to always be positive. The cable is characterized in that the maximum compressive force on the U-shaped carrier caused by bending the cable to its minimum bend radius is less than the minimum such force which could cause the U-shaped carrier to buckle toward the groove.

To achieve this result, $\sin^2 \phi$ should be greater than $[r_u A w^2/(4\pi^2 I m)]$, where $r_u$ is the perpendicular distance between said rod central axis and the centroid of a cross-section of said U-shaped carrier, A is the area of said U-shaped carrier cross-section, w is the width of said groove at said rod lateral peripheral surface, m is a minimum bend radius of said cable, and I is the moment of inertia of said U-shaped carrier about a line which contains said centroid and is tangent to the circle of radius $r_u$ which contains said centroid and whose center is located on said rod central axis.

If the second handedness is opposite to said first handedness, $\phi=\theta_0+\theta_i.$ If the second handedness is the same as said first handedness, $\phi=|\theta_0-\theta_i|$, $\theta_0 \neq \theta_i$. (It is noted that where the handedness is same as the first handedness, and if $\theta_0=\theta_i$, either of two trivial solutions result: the U-shaped carriers overlie the rod ribs, in which case buckling will not occur, or the U-shaped carriers overlie the rod grooves, in which case the U-shaped carriers are not prevented from entering the rod grooves.)

If the U-shaped carriers are helically stranded and the rod grooves have an alternating handedness (S-Z), then both of the above conditions should be met. This is so because a U-shaped carrier will cross over a rod groove at points where the handedness is opposite and at points where the handedness is the same. Choosing $\phi=|\theta_0-\theta_i|$ results in an acceptable cable because this is the more exacting of the two conditions.

The term "minimum bend radius," designated herein as m, has a well-known meaning in the fiber optic cable industry. A minimum bend radius for a single optical fiber indicates the maximum bend that can be tolerated without damage to the optical fiber or unacceptable attenuation increases. Likewise, a cable minimum bend radius is the minimum bend radius that can be experienced by the cable without an unacceptable risk of damage to the optical fiber elements contained within the cable or unacceptable attenuation increases. In practice, the cable minimum bend radius is specified by the manufacturer of the optical fiber cable.

BRIEF DESCRIPTION OF THE DRAWINGS

FIGS. 4 a–c depict a cross-sectional view of buckling of a U-shaped carrier into a rod groove;

FIG. 5 is a plan schematic view depicting the angle φ of crossover of two helical cable elements; and, FIG. 6 is a schematic view depicting the stranding of a cable according to the invention.

DETAILED DESCRIPTION OF THE INVENTION

Figure 1:
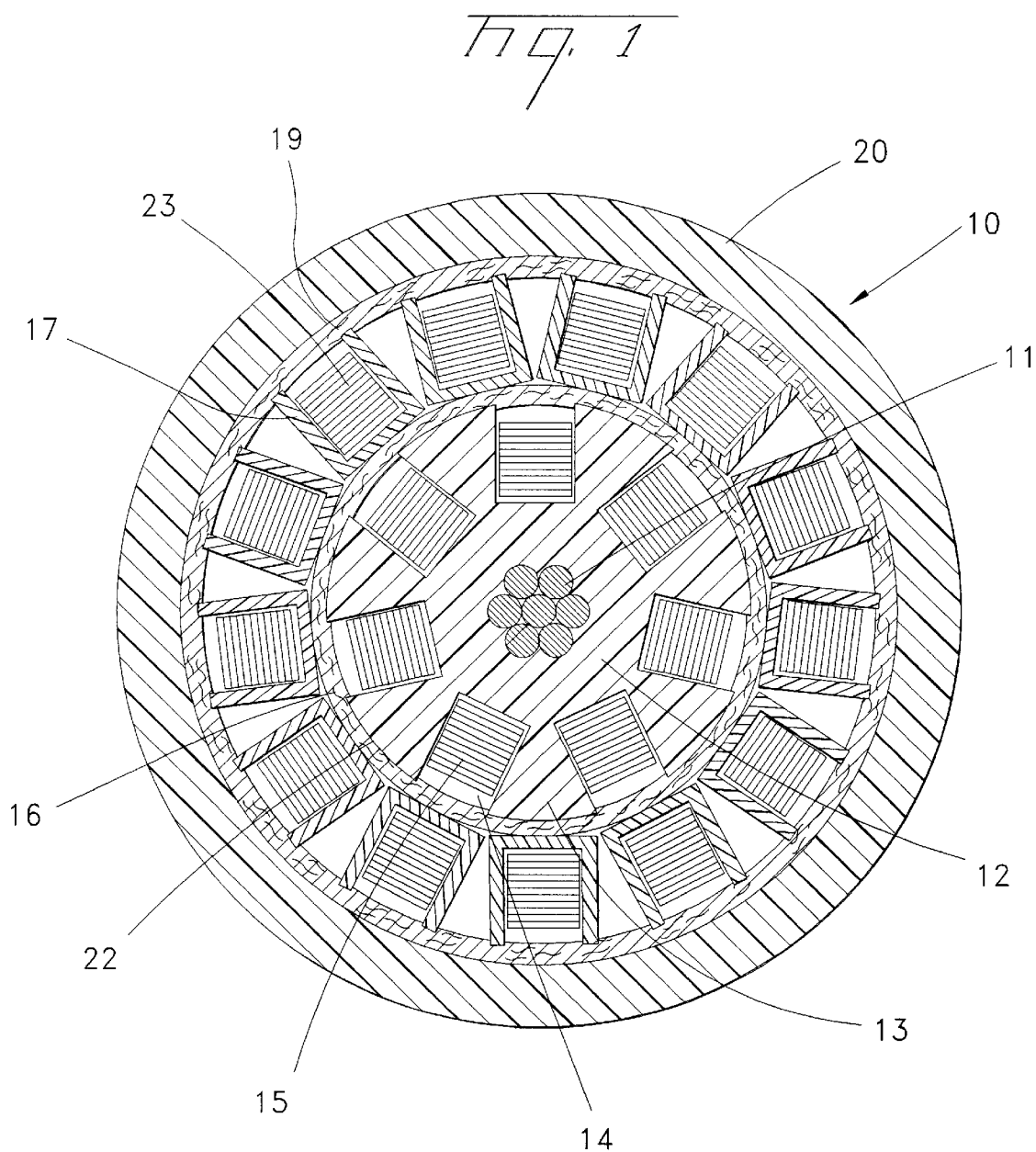
FIG. 1 is a cross-section of a cable according to the invention including 3200 optical fibers.

An ultra-high density, 3200-fiber, hybrid slotted core/U-shaped carrier ribbon cable 10 including 16-fiber ribbons containing 250 µm OD optical fibers is shown in FIG. 1. The inner core of this cable includes a rod 12 comprising a coaxial central strength member 11 overcoated with plastic. The outer peripheral surface 22 of rod 12 includes ribs 13 and seven grooves 14 each holding a stack of optical fiber ribbons 15. In cable 10, ten ribbons 15 are inserted into each groove 14. Ribbons 15 each may contain 16 optical fibers. Thirteen U-shaped carriers 17 are stranded around rod 12. Each U-shaped carrier 17 contains a stack of ten 16-fiber ribbons 23. The 16-fiber ribbons are easily separable into four, 4-fiber ribbon subunits, A water-absorptive tape 19 is provided over carriers 17 and a tape 16 about rod 12 separates rod 12 from carriers 17.

Tape 16, which may comprise a non-woven polyester material, does not of itself have sufficient strength to prevent inward buckling of carriers 17 under compressive strains caused by bending of cable 10 to its minimum bend radius.

Various ribbon coating materials were investigated to obtain low ribbon-to-ribbon and ribbon-to-groove/U-shaped carrier friction, and to minimize microbending effects on ribbon stack corner fibers. Ribbon edge-fiber maximum straight cable strains were calculated for both the inner slotted rod and the outer U-shaped carrier layer. U-shaped carrier strains also were estimated.

Processing improvements were made to allow for the manufacture of the large slotted rod/U-shaped carrier components required for the 3200-fiber cable structure. The shapes of the grooves and U-shaped carriers are also important in the design of the cable capable of holding up to 3200 optical fibers. A groove/U-shaped carrier shape was developed which minimizes the cable diameter while providing mechanical integrity. FIG. 1 may depict a cable in which the U-shaped carriers and rod grooves have the same or opposite direction of helix handedness, or a cable in which the rod grooves and/or the U-shaped carriers have an alternating handedness.

Each groove and U-shaped carrier may accommodate a stack of ten 16-optical fiber ribbons. Over both the slotted rod and the layer of U-shaped carriers are waterblocking tapes. The overall polyethylene jacket 20 may be 2.5 mm thick.

The nominal diameter of the inventive cable may be 43.7 mm, which is less than the cable diameters of over 54 mm of some prior art 3000-fiber count cable designs in which slotted rods are stranded around a central member. This inventive cable design has a fiber packing density of (2.13 n )/3200 optical fibers per square millimeter of cable cross-sectional area, where there are n optical fibers in the cable, and the range of n is v to 3200. The minimum number of optical fibers in a ribbon is v. For n at or near 3200, the fiber packing density is much higher for this design than for prior 3000-fiber count cable designs in which slotted rods are stranded around a central member.

The 16-fiber ribbons include 250 µm single-mode fibers, and are separable into 4-fiber ribbon subunits. They are approximately 0.320 mm thick and 4.25 mm wide. Maximum fiber strains are calculated below for the edge fibers of such a wide ribbon. The materials and their thicknesses are the same as in an 8-fiber ribbon earlier developed. See Wagman et al, "Component optimization for slotted core cables using 8-fiber ribbons," 1995 IWCS proceedings pp. 627–634. This two-layer ribbon coating was designed to provide good ribbon separation and cable performance. Because the 16-fiber ribbon is separable (by hand or using a separation tool) into 4-fiber subunits, it can be pre-connectorized with either 4- or 8-fiber standard MT connectors. Once separated, each 4-fiber subunit is mechanically sound and fully surrounded by UV curable material.

16-fiber ribbons are chosen for high fiber count cables since they simplify the stranding operation. 16-fiber ribbons in stacks of ten allow a cable to be designed with a relatively small cable diameter and relatively low fiber strains within the cable. In addition, such stacks allow one to efficiently access fibers in the cable. In contrast, for example, the use of smaller stacks of five 4-fiber ribbons would greatly complicate location of a specific fiber among 3200.

As the number of fibers per ribbon and cable dimensions are increased to obtain a high fiber count cable, fiber strains within the cable become an increasingly important consideration. The helix angles of the slots and U-shaped carriers are chosen to keep maximum strains low while also keeping ribbon twisting low during cable bending. The maximum fiber strains (for the edge fibers in the 16-fiber ribbons) in an unbent cable were calculated to be 0.0498% in the inner slotted rod core and 0.0373% in the outer U-shaped carrier layer.

Another aspect of increasing cable dimensions is the potential for increased bending strains on the U-shaped carriers. Bending strains encompass the bending due to stranding, the bending due to the shipping reel and the bending due to cable installation.

When the cable is bent, such as when it is on a reel or going around a sheave, the bend radius of the U-shaped carrier is determined by defining a vector equation of the path of the bent helix formed by the U-shaped carrier. This vector equation is written as $$P = \left[ r_c + r_u \cos\left(\frac{2\pi r_c s}{L_u}\right) \right] \cos(s) i + \left[ r_c + r_u \cos\left(\frac{2\pi r_c s}{L_u}\right) \right] \sin(s) j + r_u \sin\left(\frac{2\pi r_c s}{L_u}\right) k \tag{1}$$

where:

P=the vector describing the path of the element in a bent cable, $r_c$=bend radius of the cable, $r_u$=radius of element from center of cable, $r_c s$=distance along the axis of the bent cable where s is in radians, $L_u$=lay length of stranded element, and i,j,k=unit vectors.

After taking first and second derivatives of Eq. (1) with respect to s, the curvature of the vector at any point along its path can be determined by using the dot products in the following equation:

$$\kappa = \frac{\sqrt{(\dot{P}\cdot\dot{P})(\ddot{P}\cdot\ddot{P}) - (\dot{P}\cdot\ddot{P})^2}}{(\dot{P}\cdot\dot{P})^{\frac{3}{2}}} \quad (2)$$

where:

κ=curvature, $\dot{P}$=first derivative of Vector P, and $\ddot{P}$=second derivative of Vector P.

The relationship between the curvature and the bend radius is $$r_b = \frac{1}{\kappa} \quad (3)$$

where $r_b$=bend radius of element.

The strain caused by bending is determined by $$\epsilon_b = \frac{r_g}{r_b} \quad (4)$$

where:

$\epsilon_b$=the maximum strain due to bending and $r_g$=the distance from the neutral bending axis of the U-shaped carrier to its top.

The maximum bending strain in the U-shaped carrier is estimated using Eqs. (1), (2), (3) and (4). Considering the 3200-fiber hybrid cable design and a minimum cable bend radius m of 15 times the cable diameter, the maximum bending strain on the U-shaped carrier is estimated to be 1.1%. This maximum bending strain is comparable to the component strains seen in lower fiber count cables such as stranded loose tube cables. The measured strain at yield is 5.0% for U-shaped carrier samples which were tested. Thus, a U-shaped carrier has bending strains of less than or equal to 1.1% at the cable's minimum bending radius.

As the size of a ribbon stack increases, the size of the groove or U-shaped carrier containing the stack increases. This makes the slotted rod and the U-shaped carrier more difficult to manufacture. As the size of these components increases, the slotted rod web thicknesses and U-shaped carrier wall thicknesses must be increased to maintain the same crush resistance. Euler's column theory was used to scale the slotted rod and U-shaped carrier thicknesses to maintain the same level of crush resistance. Larger sizes and thicknesses lead to processing challenges for both the U-shaped carrier and the slotted rod.

Both the U-shaped carrier and slotted rod are manufactured by profile extrusion. One difficulty to overcome when component size is increased is the effect of gravity on the extrudate. In each case, the material has a relatively low melt strength. As material exits from an extruder in a horizontal extrusion set-up, it can deform under its own weight. During the extrusion of either the U-shaped carrier or the slotted rod, provisions are made to control such deformation due to gravity. See U.S. Pat. No. 5,380,472.

There is a special problem to be solved in the case of a slotted rod that is extruded using a stationary die. The issue is nonuniform molten plastic flow as the extrudate leaves the extrusion die, whereby the cross-sectional shape of the extrudate changes relative to the shape of the orifice at the exit face of the die. The circumferential velocities of the extrudate are different at various radii from the axis of the rod: the larger the diameter of the rod, the larger the velocity gradient generated between the top and the bottom of the slot. The gradient can be ignored for small diameter rods; however, for larger diameters, the extrusion die must be designed to compensate for the velocity gradients. Another processing problem to be overcome for a large U-shaped carrier is the differential cooling across the profile. This problem is solved by compensating with the design of the die so that the stresses are minimized. A further discussion of solutions of these problems may be found in U.S. patent application Ser. No. 08/617,710 filed Apr. 1, 1996 titled "Method and Apparatus for use in the manufacture of optical cable slotted rods," incorporated herein by reference.

Figure 2:
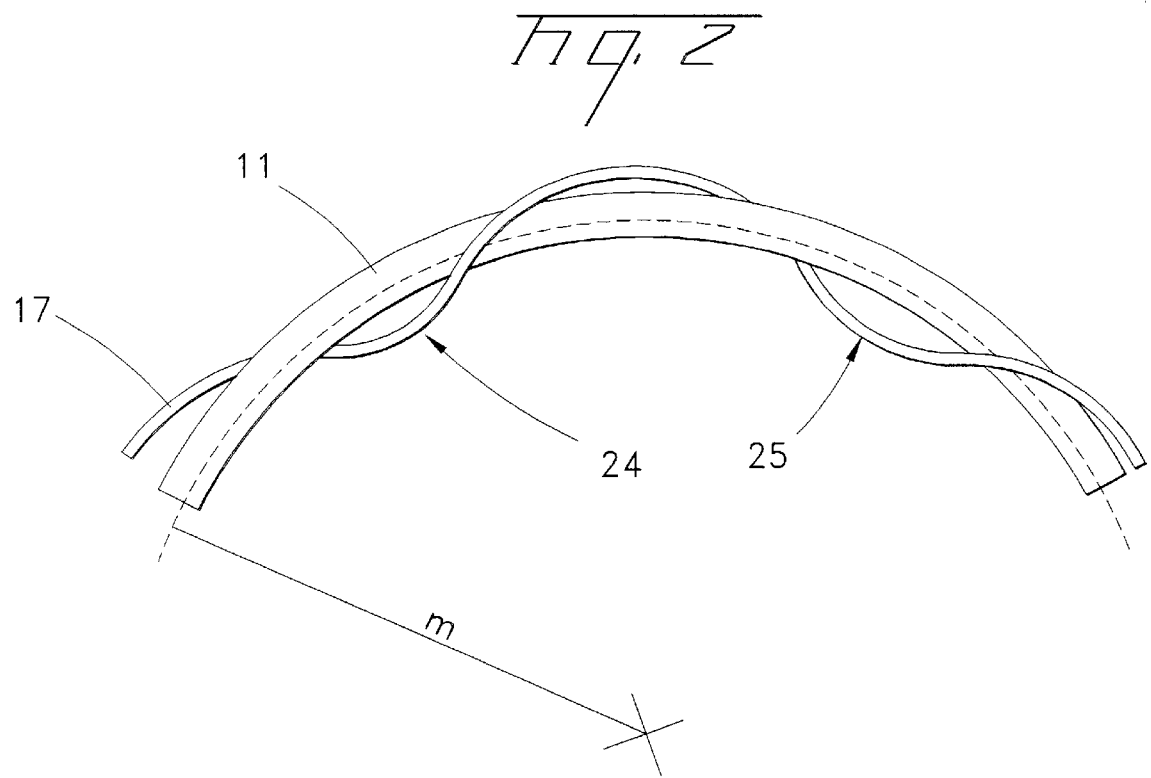
FIG. 2 is a schematic view of a bent stranded cable element.

FIG. 2 depicts cable components including a U-shaped carrier 17 stranded about a curved rod including a central steel member 11 The plastic coating on steel 11 is not included in FIG. 2 for clarity. The minimum bending radius of the cable is designated by the letter m. As the cable is bent, U-shaped carrier 17 experiences compression as it traverses the inside of the curve, as designated at points 24 and 25.

Figure 3:
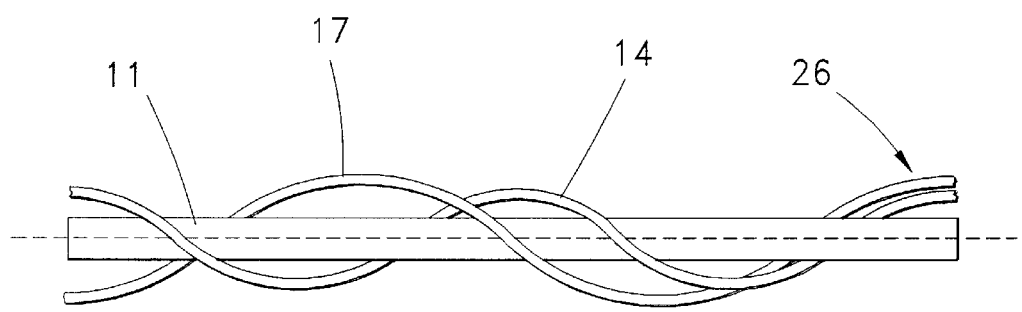
FIG. 3 is a schematic view of cable helical elements which have a crossover point;.

FIG. 3 depicts two units, a rod groove 14 and a U-shaped carrier 17, proceeding helically about a central steel member 11. At point 26, the units are at a crossover point, and overlap over a certain length. At such a crossover point 26, an incursion by a U-shaped carrier 17 into a rod groove 14 may occur during cable bending, as shown in FIGS. 4a–4c.

In FIG. 4a, the cable elements are in a normal position. Ribbons 15 are inserted in groove 14 of rod 12. Ribbons 23 are inserted in U-shaped carrier 17. The centroid 18 of the depicted cross-section of U-shaped carrier 17 is shown. A U-shaped carrier moment of inertia I is defined about line L, which contains centroid 18 and is tangent to the circle of radius $r_u$ which contains centroid 18 and whose center is located on the central axis of rod 12. $r_u$ is the perpendicular distance between the rod central axis and the centroid of a cross-section of the U-shaped carrier. In FIG. 4b, U-shaped carrier 17 has buckled about line L under compression and intrudes into groove 14. Buckling could also cause U-shaped carrier 17 to become tilted into groove 14, as shown in FIG. 4c.

The geometry of a crossover point in the case of opposite handedness of a U-shaped carrier and a rod groove is depicted in FIG. 5. A U-shaped carrier 17 has a helix angle $\theta_o$ and rod groove 14 has a width w and a helix angle $\theta_i$. The distance by which U-shaped carrier 17 overlies rod groove 14 is the crossover length $L_s$. The angle φ is defined between U-shaped carrier 17 and rod groove 14. $L_s$=w/sin φ.

The minimum compressive force $P_c$ which will cause the U-shaped carrier to buckle is found using Euler's Column Theory for a column having two fixed ends. $P_c = 4\pi^2 E I/L_s^2$, where $P_c$, I, and $L_s$ are as previously defined and E is the Young's modulus of the material in a U-shaped carrier. Using $L_s$=w/sin φ, $P_c = 4\pi^2 \sin^2\phi \, E I/w^2$.

The maximum compressive strain $\epsilon_b$ on the U-shaped carrier caused by cable bending is $\epsilon_b = r_u/m$, where $r_u$ is the distance from the center of the cable to centroid 18 of the U-shaped carrier, and m is the minimum bend radius of a cable.

The maximum compressive force $P_b$ on the U-shaped carrier from cable bending is by definition $P_b = \epsilon_b E A$, where E is the Young's modulus and A is the area in cross-section of a U-shaped carrier.

The U-groove will not buckle into the groove if $P_b<P_c$, or $(r_u/m)$ EA$<4\pi^2$ sin$^2\phi$ E I/w$^2$. Simplifying, $$\sin^2\phi > r_u A\ w^2/(\pi^2\ I\ m). \quad \text{(Eq. 1)}$$

The relationship between the helix angles and $\phi$ now will be considered. Five cases will be considered.

In the first case, where the handednesses of the U-shaped carriers and the rod grooves are the same, $\phi$ is simply the magnitude of difference between the helix angles $\theta_O$ and $\theta_i$, or $\phi=|\theta_O-\theta_i|$.

In the second case, where the handednesses of the U-shaped carriers and the rod grooves are opposite, $\phi=\theta_O+\theta_i$. The second case is illustrated in FIG. 5.

In the third case, the U-shaped carriers have a unidirectional helix angle $\theta_0$ and the rod grooves have an alternating handedness (S-Z), in which the groove includes a first section having a helix angle $\theta_i$ in a first handedness, a short transition switchback section, and a third section having a helix angle $\theta_i$ in the opposite handedness. As the condition for the first case is considered more exacting than the condition in the second case, $\phi=|\theta_O-\theta_i|$ for cables of the third case.

In the fourth case, the U-shaped carriers have an alternating handedness (S-Z), in which the groove includes a first section having a helix angle $\theta_i$ in a first handedness, a short transition switchback section, and a third section having the same helix angle $\theta_i$ in the opposite handedness. The rod grooves have a unidirectional helix angle $\theta_O$. As the condition for the first case is considered more exacting than the condition in the second case, $\phi=|\theta_O-\theta_i|$ for cables of the fourth case.

In the fifth case, the U-shaped carriers have an alternating handedness (S-Z), in which the groove includes a first section having a helix angle $\theta_i$ in a first handedness, a short transition switchback section, and a third section having a helix angle $\theta_i$ in the opposite handedness. The rod grooves also have an alternating handedness (S-Z). As the condition for the first case is considered more exacting than the condition in the second case, $\phi=|\theta_O-\theta_i|$ for cables of the fifth case.

In order to achieve good attenuation performance and to have low fiber strain during bending, the cable stranding process must be precise. FIG. 6 shows a stranding line for a hybrid slotted rod/U-shaped carrier cable. The stranding method and layout is chosen for simplicity of organization and the ease of ribbon tension control. On the first stranding pass, a reel containing the slotted rod is placed on a rotating payoff 27 and the rod is threaded though the stranding line to the rotating takeup 32. Seventy 16-fiber ribbons are unwound from payoffs 29 and stranded in the slots, 10 ribbons per slot. Between the ribbon insertion point 30 and the rotating takeup 32, a layer of water blocking tape and binders are applied. Payoff 28 is not used on the first pass.

The reel containing this inner portion of the core is then moved to the rotating payoff 27 and threaded though the stranding line. Thirteen U-shaped carriers 17 are stranded around the inner core from payoff 28 in the second pass. A total of 130 ribbons are stranded in the U-shaped carriers, 10 per U-shaped carrier. An overall layer of swellable tape and binders are then applied. Again, for the prototype, 10 sixteen-fiber ribbons were stranded in one of the U-shaped carriers. Payoffs 29 are not used in the second pass.

The path of each ribbon and each U-shaped carrier is designed so that bend radii are never less than the appropriate minimum bend radii. Furthermore, the tension on each element, in particular each ribbon, is closely controlled during the stranding process.

Bi-directional OTDR attenuation was measured on all 320 fibers after manufacturing a prototype hybrid 3200-fiber design cable in which ribbons were inserted in only one groove and in only one U-shaped carrier. The mean attenuation at 1550 nm was 0.20 dB/km with a standard deviation of 0.01 dB/km (maximum=0.29 dB/km). At 1310 nm, the mean attenuation was 0.34 dB/km with a standard deviation of 0.01 dB/km (maximum=0.37 dB/km).

Of the 160 fibers in each ribbon stack, 40 were measured for attenuation during temperature cycling. With one filled slot and one filled U-shaped carrier, 80 measurements were made in total (n=80).

Table I presents a summary of the temperature cycling results for the prototype. In the row containing the "23° C." data, the mean 1550 nm attenuation after manufacture was 0.23 dB/km with a standard deviation of 0.05 dB/km. The cable had acceptable attenuation performance during thermal cycling, as shown in Table I. The temperature cycling involved two excursions each to --30° C. and +60° C. For each temperature, the two sets of results are pooled (n=160).

The maximum change in 1550 nm attenuation at -30° C. was 0.10 dB/km with a standard deviation of 0.04 dB/km (See Table I). The mean 1550 nm attenuation at -30° C. was 0.20 dB/km with a standard deviation of 0.02. The maximum 1550 nm attenuation change at +60° C. was 0.11 dB/km with a standard deviation of 0.02 dB/km. The mean 1550 nm attenuation at +60° C. was 0.23 dB/km with a standard deviation of 0.04 dB/km.

Attenuation change during mechanical tests was measured at 1550 nm. Measurement accuracy in the bending elongation and lateral load tests was within ±0.02 dB. Accuracy for the squeeze test was within ±0.03 dB.

200, 300, 400 and 600 mm radius mandrels were used for the bending tests. For the 200 mm mandrel, the maximum attenuation increase observed was 0.03 dB. This occurred in the filled U-shaped carrier. For the larger mandrels, no increase larger than the measurement error was observed.

A 0.95 m length of cable was bent somewhat more than 90° around a 600 mm mandrel. The load on the cable was set at 788 kg; this corresponds to 0.20% cable elongation if one uses a tensile modulus of 170 kN/mm$^2$ for the 6.0 mm stranded steel central member. No attenuation increase larger than the measurement error was observed during the squeeze test.

Lateral loads of 1000N, 2000N and 3000N were applied over a cable length of 100 mm in this test. The load on the cable was maintained for 10 minutes before measurements were taken. No increase in attenuation larger than the measurement error was observed at any of the lateral loads. Furthermore, there was no permanent deformation of the slotted rod or the U-shaped carriers at 3000N/100 mm.

Loads were applied to approximately 19.5 m of cable in this test. The cable was tested at elongations of 0.10%, 0.15%, 0.20% and 0.25%. No increase in attenuation larger than the measurement error was observed for elongations up to 0.25%, corresponding to a load of 984 kg.

TABLE I

Hybrid 3200-Fiber Cable Temperature Cycling Results

| | Attenuation (dB/km) | | Change in Attenuation (dB/km) | | Number of |
|---|---|---|---|---|---|
| | Mean | St. Dev. | Mean | St. Dev. | Fibers |
| 1300 nm | | | | | |
| Initial 23° C. | 0.34 | 0.01 | — | — | 80 |
| −30° C. | 0.34 | 0.01 | −0.01 | 0.01 | 160 |
| +60° C. | 0.35 | 0.02 | 0.01 | 0.01 | 160 |
| Final 23° C. | 0.34 | 0.01 | — | — | 80 |
| 1550 nm | | | | | |
| Initial 23° C. | 0.23 | 0.05 | — | — | 80 |
| −30° C. | 0.20 | 0.02 | −0.02 | 0.04 | 160 |
| +60° C. | 0.23 | 0.04 | 0.00 | 0.02 | 160 |
| Final 23° C. | 0.20 | 0.02 | — | — | 80 |

A 3200-fiber design hybrid slotted rod/U-shaped carrier prototype cable was manufactured and used for field installation at NTT's Access Network Systems Laboratory. The 1000 meter long prototype cable was installed in a system of ducts at Tsukuba, Japan. Cable attenuation and fiber strain (using a B-OTDA) were measured before and after installation. Also, mid-span access attenuation measurements and excess cable storage at bending radii down to 350 mm were examined. The 3200-fiber cable met or exceeded the customer's specifications in all tests.

In summary, we have designed, manufactured and tested a hybrid slotted rod/U-shaped carrier cable design for up to 3200 optical fibers. The hybrid design has increased fiber density and reduced cable diameter over multi-core SCR cable designs. To our knowledge, the cable cross-section packing density of 2.13 fibers/mm² presented here is the highest of any cable design manufactured using standard 250 μm OD fiber.

Maximum unbent cable fiber strains are calculated to be <0.05% for both the inner slotted rod and the outer U-shaped carrier layer. U-shaped carrier bending strains are estimated to be about 1.1%. This is comparable to the component strains seen in lower fiber count cables such as stranded loose tube cables.

The hybrid cable had acceptable attenuation performance during thermal cycling and exhibited excellent performance during mechanical testing. Consequently, the prototype cable demonstrates the feasibility of using a hybrid slotted rod/U-shaped carrier cable for the multimedia optical access network.

Table II below lists parameters for two inventive cables and two comparative cables. $r_i$ is the radial distance between the center of the rod and the point that is midway between the outer periphery of the rod and the radially innermost surface of the U-shaped carrier. The pitches and $r_i$ are given to aid in the determination of the helix angles.

TABLE II

| Parameter | Inventive Cable 1 | Comparative Cable 1 | Inventive Cable 2 | Comparative Cable 2 |
|---|---|---|---|---|
| handedness | opposite | opposite | same | same |
| $r_u$, mm | 15.1 | 15.1 | 15.1 | 15.1 |
| E, N/mm² | 2170 | 2170 | 2170 | 2170 |
| A, mm² | 14.0 | 14.0 | 14.0 | 14.0 |
| m | 656 mm | 656 mm | 656 mm | 656 mm |
| I, mm⁴ | 49.70 | 49.70 | 49.70 | 49.70 |
| w, mm | 4.7 | 4.7 | 4.7 | 4.7 |
| $r_i$, mm | 12.45 | 12.45 | 12.45 | 12.45 |
| pitch, groove | 500 mm | 2750 mm | 500 mm | 500 mm |
| pitch, U-carrier | 650 mm | 3000 mm | 900 mm | 650 mm |
| $\theta_i$ | 8.892° | 1.630° | 8.892° | 8.892° |
| $\theta_o$ | 6.912° | 1.494° | 4.986° | 6.912° |

For each cable, $P_b$=700N.

For inventive cable 1, $\phi$=15.75°. $P_c$=14,200N, which is greater than 700N. Buckling will not occur at the minimum bend radius of the cable.

For comparative cable 1, $\phi$=3.124°. $P_c$=572N, which is less than 700N. Buckling will occur at the minimum bend radius of the cable.

For inventive cable 2, $\phi$=3.996°. $P_c$=936N, which is greater than 700N. Buckling will not occur.

For comparative cable 2, $\phi$=2.030°. $P_c$=240N, which is less than 700N. Buckling will occur at the minimum bend radius of the cable.

It is to be understood that the invention is not limited to the exact details of the construction, operation, exact materials, or embodiments shown and described, as modifications and equivalents will be apparent to one skilled in the art without departing from the scope of the invention.

What is claimed is:

1. An optical fiber cable having a minimum bend radius and comprising at least one U-shaped carrier helically stranded at a first helix angle $\theta_0$ and a first handedness about a central rod having a central axis and including in its lateral peripheral surface at least one groove proceeding helically at a second helix angle $\theta_i$ and a second handedness, said groove containing at least one optical fiber element, second handedness is opposite to said first handedness and $(\theta_0+\theta_i)$ is greater than a predetermined angle.

2. An optical fiber cable as set out in claim 1, wherein $\sin^2\phi > [r_u A w^2/(4 \pi^2 I m)]$, where
$\phi=\theta_O+\theta_i$, $r_u$ is the perpendicular distance between said rod central axis and the centroid of a cross-section of said U-shaped carrier, A is the area of said U-shaped carrier cross-section, w is the width of said groove at said rod lateral peripheral surface, m is said cable minimum bend radius, and I is the moment of inertia of said U-shaped carrier about a line which contains said centroid and is tangent to the circle of radius $r_u$ which contains said centroid and whose center is located on said rod central axis.

3. An optical fiber cable having a minimum bend radius and comprising at least one U-shaped carrier helically stranded at a first helix angle $\theta_0$ and a first handedness about a central rod having a central axis and including in its lateral peripheral surface at least one groove proceeding helically at a second helix angle $\theta_i$ and a second handedness, said groove containing at least one optical fiber element, said second handedness is the same as said first handedness and $|\theta_0-\theta_i|$ is greater than a predetermined angle whereby upon bending of said optical fiber cable said U-shaped carrier does not buckle and intrude into said at least one groove.

4. An optical fiber cable as set out in claim 3, wherein $\sin^2\phi > [r_u A w^2/(4 \pi^2 I m)]$, where
$\phi=|\theta_0-\theta_i|$, $\theta_0 \neq \theta_i$, $r_u$ is the perpendicular distance between said rod central axis and the centroid of a cross-section of said U-shaped carrier, A is the area of said U-shaped carrier cross-section, w is the width of said groove at said rod lateral peripheral surface, m is said cable minimum bend radius, and I is the moment of inertia of said U-shaped carrier about a line which contains said centroid and is tangent to the circle of radius $r_u$ which contains said centroid and whose center is located on said rod central axis.

5. An optical fiber cable having a minimum bend radius and comprising at least one U-shaped carrier helically stranded at a first helix angle $\theta_0$ a central rod having a central axis and including in its lateral peripheral surface at least one groove having an alternating direction of lay comprising a second helix angle $\theta_i$, said groove containing at least one optical fiber element, $\sin^2\phi >$, where $\phi = |\theta_0 - \theta_i|$, $\theta_0 \neq \theta_i$, $r_u$ is the distance between said rod central axis and the centroid of a cross-section of said U-shaped carrier, A is the area of said U-shaped carrier cross-section, w is the width of said groove at said rod lateral peripheral surface, m is said cable minimum bend radius, and I is the moment of inertia of said U-shaped carrier about a line which contains said centroid and is tangent to the circle of radius $r_u$ which contains said centroid and whose center is located on said rod central axis.

6. An optical fiber cable having a minimum bend radius and comprising at least one U-shaped carrier comprising a first helix angle $\theta_0$ whereby the U-shaped carrier is stranded about a central rod having a central axis and including in its lateral peripheral surface at least one groove comprising a second helix angle $\theta_i$, said groove containing at least one optical fiber element, the maximum compressive force on said U-shaped carrier caused by bending the cable to its minimum bend radius is less than the minimum such force which could cause said U-shaped carrier to buckle toward said groove and wherein $\sin^2\phi > [r_u A w^2/(4 \pi^2 I m)]$, where $\phi$ is a function of $(\theta_0, \theta_I)$, $r_u$ is the perpendicular distance between said rod central axis and the centroid of a cross-section of said U-shaped carrier, A is the area of said U-shaped carrier cross-section, w is the width of said groove at said rod lateral peripheral surface, m is said cable minimum bend radius, and I is the moment of inertia of said U-shaped carrier about a line which contains said centroid and is tangent to the circle of radius $r_u$ which contains said centroid and whose center is located on said rod central axis.

7. An optical fiber cable as set out in claim 6, wherein said cable has a fiber density of at least $(2.13 n)/3200$ optical fibers per square millimeter of cable cross-sectional area, where there are n optical fibers in the cable.

8. An optical fiber cable as set out in claim 6, wherein said cable has an outer diameter of less than 54 mm.

9. An optical fiber cable as set out in claim 6, wherein said U-shaped carrier has a maximum bending strain of less than or equal to 1.1% at the cable's minimum bending radius.

10. An optical fiber cable as set out in claim 6, wherein m does not exceed 15 times the cable outer diameter.

11. An optical fiber cable having a minimum bend radius and comprising at least one U-shaped carrier stranded with an alternating direction of lay comprising a first helix angle $\theta_0$ about a central rod having a central axis and including in its lateral peripheral surface at least one helical groove comprising a second helix angle $\theta_i$, said groove containing at least one optical fiber element, the maximum compressive force on said U-shaped carrier caused by bending the cable to its minimum bend radius is less than the minimum such force which could cause said U-shaped carrier to buckle toward said groove.

12. An optical fiber cable as set out in claim 11, wherein $\sin^2\phi > [r_u A w^2/(4 \pi^2 I m)]$, where $\phi = |\theta_0 - \theta_i|$, $\theta_0 \neq \theta_i$, $r_u$ is the perpendicular distance between said rod central axis and the centroid of a cross-section of said U-shaped carrier, A is the area of said U-shaped carrier cross-section, w is the width of said groove at said rod lateral peripheral surface, m is said cable minimum bend radius, and I is the moment of inertia of said U-shaped carrier about a line which contains said centroid and is tangent to the circle of radius $r_u$ which contains said centroid and whose center is located on said rod central axis.

13. An optical fiber cable having a minimum bend radius and comprising at least one U-shaped carrier stranded with an alternating direction of lay comprising a first helix angle $\theta_0$ about a central rod having a central axis and including in its lateral peripheral surface at least one groove, said groove having an alternating direction of lay comprising a second helix angle $\theta_i$ and containing at least one optical fiber element, the maximum compressive force on said U-shaped carrier caused by bending the cable to its minimum bend radius is less than the minimum such force which could cause said U-shaped carrier to buckle toward said groove.

14. An optical fiber cable as set out in claim 13, wherein $\sin^2\phi > [r_u A w^2/(4 \pi^2 I m)]$, where $\phi = |\theta_0 - \theta_i|$, $\theta_0 \neq \theta_i$, $r_u$ is the perpendicular distance between said rod central axis and the centroid of a cross-section of said U-shaped carrier, A is the area of said U-shaped carrier cross-section, w is the width of said groove at said rod lateral peripheral surface, m is said cable minimum bend radius, and I is the moment of inertia of said U-shaped carrier about a line which contains said centroid and is tangent to the circle of radius $r_u$ which contains said centroid and whose center is located on said rod central axis.

15. An optical fiber cable having a minimum bend radius and comprising at least one U-shaped carrier comprising a first helix angle $\theta_0$ whereby the U-shaped carrier is stranded about a central rod having a central axis and including at least one groove comprising a second helix angle $\theta_i$, said groove containing at least one optical fiber element, the maximum compressive force on said U-shaped carrier caused by bending the cable to its minimum bend radius is less than the minimum such force which could cause said U-shaped carrier to buckle toward said groove and wherein $\sin^2 \phi > [r_u A w^2/(4 \pi^2 I m)]$, where $\phi$ is a function of $(\theta_0, \theta_I)$ $r_u$ is the perpendicular distance between said rod central axis and the centroid of a cross-section of said U-shaped carrier, A is the area of said U-shaped carrier cross-section, w is the width of said groove at said rod lateral peripheral surface, m is said cable minimum bend radius, and I is the moment of inertia of said U-shaped carrier about a line which contains said centroid and is tangent to the circle of radius $r_u$ which contains said centroid and whose center is located on said rod central axis.

16. The optical fiber cable of claim 15, wherein said carrier has a first handedness and said groove has a second handedness opposite to said first handedness, and $(\theta_0 + \theta_i)$ is greater than a predetermined angle.

17. The optical fiber cable of claim 15, wherein said carrier has a first handedness and said groove has a second handedness generally the same as said first handedness, and $|\theta_0 - \theta_i|$ is greater than a predetermined angle.

18. The optical fiber cable of claim 15, wherein said carrier has a first handedness and said groove has an alternating direction of lay, and $\phi = |\theta_0 - \theta_i|$, $\theta_0 \neq \theta_i$.

19. The optical fiber cable of claim 15, wherein said U-shaped carrier has a maximum bending strain of less than or equal to 1.1% at the cable's minimum bending radius.

20. The optical fiber cable of claim 15, wherein said carrier has an alternating direction of lay, said groove has a helical lay, and $\phi = |\theta_0 - \theta_i|$, $\theta_0 \neq \theta_i$.

21. The optical fiber cable of claim 15, wherein said carrier and siad groove have an alternating direction of lay, and $\phi = |\theta_0 - \theta_i|$, $\theta_0 \neq \theta_i$.

* * * * *